(12) United States Patent
Frick

(10) Patent No.: US 9,880,602 B2
(45) Date of Patent: Jan. 30, 2018

(54) POWER CHARACTERISTICS IN A SYSTEM OF DISPARATE STORAGE DRIVES

(71) Applicant: Seagate Technology LLC, Cupertino, CA (US)

(72) Inventor: Guy David Frick, Lafayette, CO (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 29 days.

(21) Appl. No.: 14/720,503

(22) Filed: May 22, 2015

(65) Prior Publication Data

US 2015/0362972 A1 Dec. 17, 2015

Related U.S. Application Data

(60) Provisional application No. 62/012,205, filed on Jun. 13, 2014, provisional application No. 62/012,219, filed on Jun. 13, 2014.

(51) Int. Cl.
| | |
|---|---|
| *G06F 1/28* | (2006.01) |
| *G06F 1/32* | (2006.01) |
| *G06F 3/06* | (2006.01) |
| *G06F 11/20* | (2006.01) |

(52) U.S. Cl.
CPC .............. *G06F 1/28* (2013.01); *G06F 1/3203* (2013.01); *G06F 1/3221* (2013.01); *G06F 1/3287* (2013.01); *G06F 3/0604* (2013.01); *G06F 3/0619* (2013.01); *G06F 3/0625* (2013.01); *G06F 3/0634* (2013.01); *G06F 3/0635* (2013.01); *G06F 3/0658* (2013.01); *G06F 3/0659* (2013.01); *G06F 3/0665* (2013.01); *G06F 3/0685* (2013.01); *G06F 3/0689* (2013.01); *G06F 11/2015* (2013.01); *G06F 11/2094* (2013.01); *G06F 2201/805* (2013.01); *Y02B 60/1246* (2013.01)

(58) Field of Classification Search
CPC ..................................................... G06F 1/3203
See application file for complete search history.

(56) References Cited

U.S. PATENT DOCUMENTS

| | | | |
|---|---|---|---|
| 5,504,882 A | 4/1996 | Chai et al. | |
| 5,778,374 A | 7/1998 | Dang et al. | |
| 6,332,139 B1 | 12/2001 | Kaneko et al. | |
| 6,560,155 B1 | 5/2003 | Hush | |
| 6,766,420 B2 | 7/2004 | Rawson, III | |

(Continued)

FOREIGN PATENT DOCUMENTS

WO 2014-065841 A1 5/2014

OTHER PUBLICATIONS

Caulfield, et al., "Moneta: A High-performance Storage Array Architecture for Next-generation, Non-volatile Memories," Dept. of Computer Science & Engineering, U.C. San Diego, California, 2010, 11 pages.

(Continued)

*Primary Examiner* — Nitin C Patel
(74) *Attorney, Agent, or Firm* — Holzer Patel Drennan

(57) ABSTRACT

A mass data storage system includes a plurality of communicatively coupled storage drives powered by one or more power supplies. A power map defines the relationships between the storage drives and the power supplies and power rules/policies define the maximum permissible power load on each power supply at any point in time.

18 Claims, 4 Drawing Sheets

(56) References Cited

U.S. PATENT DOCUMENTS

| | | | |
|---|---|---|---|
| 6,959,399 B2 | 10/2005 | King et al. | |
| 6,986,075 B2 | 1/2006 | Ackaret et al. | |
| 7,124,272 B1 | 10/2006 | Kennedy et al. | |
| 7,210,005 B2 | 4/2007 | Guha et al. | |
| 7,237,129 B2 | 6/2007 | Fung | |
| 7,318,164 B2 | 1/2008 | Rawson, III | |
| 7,334,140 B2 | 2/2008 | Jones et al. | |
| 7,434,090 B2 | 10/2008 | Hartung et al. | |
| 7,443,759 B1 | 10/2008 | Rowlands et al. | |
| 7,516,348 B1 | 4/2009 | Ofer | |
| 7,568,122 B2 | 7/2009 | Mechalke et al. | |
| 7,661,005 B2 * | 2/2010 | Spengler | G11B 33/126 365/226 |
| 7,699,023 B2 | 2/2010 | Murase | |
| 7,673,167 B2 | 3/2010 | Elliott et al. | |
| 7,702,853 B2 | 4/2010 | Hetzler et al. | |
| 7,859,834 B2 | 12/2010 | Fukuda et al. | |
| 8,024,602 B2 | 9/2011 | Decenzo et al. | |
| 8,161,303 B2 | 4/2012 | Hakamata | |
| 8,161,317 B2 | 4/2012 | Ishii et al. | |
| 8,286,015 B2 * | 10/2012 | Olarig | G06F 1/3221 711/112 |
| 8,412,986 B2 | 4/2013 | Ishii et al. | |
| 8,473,779 B2 | 6/2013 | Siewert et al. | |
| 8,495,276 B2 | 7/2013 | Han et al. | |
| 8,555,027 B2 | 10/2013 | Kimura et al. | |
| 8,583,838 B1 | 11/2013 | Marshak et al. | |
| 8,947,816 B1 | 2/2015 | Ryan et al. | |
| 9,235,486 B1 * | 1/2016 | Casaburi | G06F 11/2094 |
| 2005/0228943 A1 | 10/2005 | Decenzo et al. | |
| 2006/0004868 A1 | 1/2006 | Claudatos et al. | |
| 2006/0062383 A1 | 3/2006 | Kaneda et al. | |
| 2006/0206730 A1 * | 9/2006 | Cartes | G06F 1/26 713/300 |
| 2007/0016811 A1 * | 1/2007 | Suzuki | G06F 1/26 713/300 |
| 2007/0220316 A1 | 9/2007 | Guha | |
| 2008/0276043 A1 | 11/2008 | Hetzler et al. | |
| 2009/0083558 A1 | 3/2009 | Sugiki et al. | |
| 2009/0089504 A1 | 4/2009 | Soran et al. | |
| 2009/0119530 A1 | 5/2009 | Fisk et al. | |
| 2009/0147393 A1 * | 6/2009 | Hakamata | G06F 1/3221 360/69 |
| 2009/0150593 A1 | 6/2009 | Hamilton et al. | |
| 2009/0198928 A1 | 8/2009 | Kommu | |
| 2009/0249003 A1 | 10/2009 | Bates et al. | |
| 2010/0011229 A1 | 1/2010 | Davis et al. | |
| 2010/0138677 A1 | 6/2010 | Pagan et al. | |
| 2011/0029787 A1 * | 2/2011 | Day | G06F 1/266 713/300 |
| 2011/0083039 A1 | 4/2011 | Kim et al. | |
| 2011/0239013 A1 | 9/2011 | Muller | |
| 2011/0302224 A1 | 12/2011 | Yairi et al. | |
| 2012/0210169 A1 | 8/2012 | Coile et al. | |
| 2012/0233484 A1 | 9/2012 | Rossi | |
| 2012/0272038 A1 | 10/2012 | Wei et al. | |
| 2012/0297114 A1 | 11/2012 | Koizumi et al. | |
| 2013/0304963 A1 | 11/2013 | Luo et al. | |
| 2013/0346793 A1 | 12/2013 | Flynn et al. | |
| 2014/0003180 A1 * | 1/2014 | Matsuda | G01R 21/00 365/226 |
| 2014/0047261 A1 | 2/2014 | Patiejunas et al. | |
| 2014/0281194 A1 | 9/2014 | Gaertner et al. | |
| 2014/0297700 A1 | 10/2014 | Vongsouvanh | |
| 2015/0197330 A1 | 7/2015 | Mayer et al. | |
| 2015/0362968 A1 | 12/2015 | Jurey et al. | |
| 2015/0362983 A1 | 12/2015 | Frick | |
| 2015/0363109 A1 | 12/2015 | Frick et al. | |
| 2015/0363126 A1 | 12/2015 | Frick | |
| 2015/0363127 A1 | 12/2015 | Frick | |
| 2015/0363288 A1 | 12/2015 | Frick | |

OTHER PUBLICATIONS

Delaluz, et al., "Memory Energy Management Using Software and Hardware Directed Power Mode Control," Dept. of Computer Science & Engineering, Pennsylvania State University, Pennsylvania, 2001, 21 pages.

Deng, et al., "Architectures and Optimization Methods of Flash Memory Based Storage Systems," Journal of Systems Architecture 57, Department of Computer Science, Jinan University, China, 2011, 14 pages.

Dittia, et al, "The APIC Approach to High Performance Network Interface Design: Protected DMA and Other Techniques," Dept. of Computer Science, Washington University, St. Louis, MO, 1997, 24 pages.

Gibson, et al., "A Case for Network-Attached Secure Disks," School of Computer Science Carnegie Mellon University, Pittsburgh, PA, Sep. 1996, 19 pages.

Jin, et al., "High-speed Data Channel in the Disk Array System," Broadband European Networks and Multimedia Services 580, Sep. 1998, 2 pages.

Katz, Randy H., "High Performance Network and Channel-Based Storage," Computer Science Division, Dept. of EE and Computer Sciences, U.C Berkeley, CA, Sep. 1991, 41 Pages.

Kottke, Thomas, "An Economical Data Acquisition System for Measuring and Recording Multiple Channels of Information at High Rates," Army Research Laboratory, National Technical Information Service, U.S. Dept. of Commerce, Springfield, VA, Sep. 1995, 79 pages.

Kumon, Kouichi, "Overview of Next-Generation Green Data Center," Fujitsu Sci. Tech, vol. 48, No. 2, Apr. 2012, 7 pages.

Riedel, Erik, "Active Disks—Remote Execution for Network-Attached Storage," Dissertation, School of Computer Science Carnegie Mellon University, Pittsburgh, PA, Nov. 1999, 203 pages.

Tudor, et al., "On Understanding the Energy Consumption of ARM-based Multicore Servers," Sigmetrics, Dept. of Computer Science, National University of Singapore, 2013, 12 pages.

Vekiarides, Nicos, "Fault-Tolerant Disk Storage and File Systems Using Reflective Memory," Dept. of Electrical & Computer Engineering, Carnegie Mellon University, Pittsburgh, Pennsylvania, 1995, 11 pages.

Yousif, Mazin, "Shared-storage Clusters," Cluster Computing Journal abstract, vol. 2, Issue 4, North Carolina, Dec. 1999, 6 pages.

Author Unknown, "Adaptive Memory Technology in Solid State Hybrid Drives," Seatage, retrieved on Apr. 1, 2015, 3 pages, retrieved from http://www.seagate.com/tech-insights/adaptive-memory-in-sshd-master-ti/.

Author Unknown, "DX100," Quamtum, retrieved on May 13, 2015, 1 page, retrieved from:http://www.quantum.com/serviceandsupport/softwareanddocumentationdownloads/dx100/index.aspx.

* cited by examiner

POWER CHARACTERISTICS IN A SYSTEM OF DISPARATE STORAGE DRIVES

CROSS-REFERENCE TO RELATED APPLICATIONS

The present application claims benefit of priority to U.S. Provisional Patent Application No. 62/012,205 entitled "Off-line/On-line Mass Data Storage Management" and filed on Jun. 13, 2014, and also claims benefit of priority to U.S. Provisional Patent Application No. 62/012,219 entitled "Off-line/On-line Mass Data Storage System" and filed on Jun. 13, 2014. Both of these applications are specifically incorporated by reference for all that they disclose or teach.

SUMMARY

Implementations disclosed herein provide for a method of operating a mass data storage system comprising: mapping multiple individual storage drives to one or more power supplies connected to the storage system; and defining a maximum power load on each mapped power supply during operation of the storage system.

Implementations disclosed herein further provide for a mass data storage system comprising: two or more storage drives; one or more power supplies, each of which connected to two or more of the storage drives; a control system including: a power map defining the connections between the storage drives and the power supplies; and a power rules module defining a maximum power load on each mapped power supply during operation of the storage system.

This Summary is provided to introduce a selection of concepts in a simplified form that are further described below in the Detailed Description. This Summary is not intended to identify key features or essential features of the claimed subject matter, nor is it intended to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
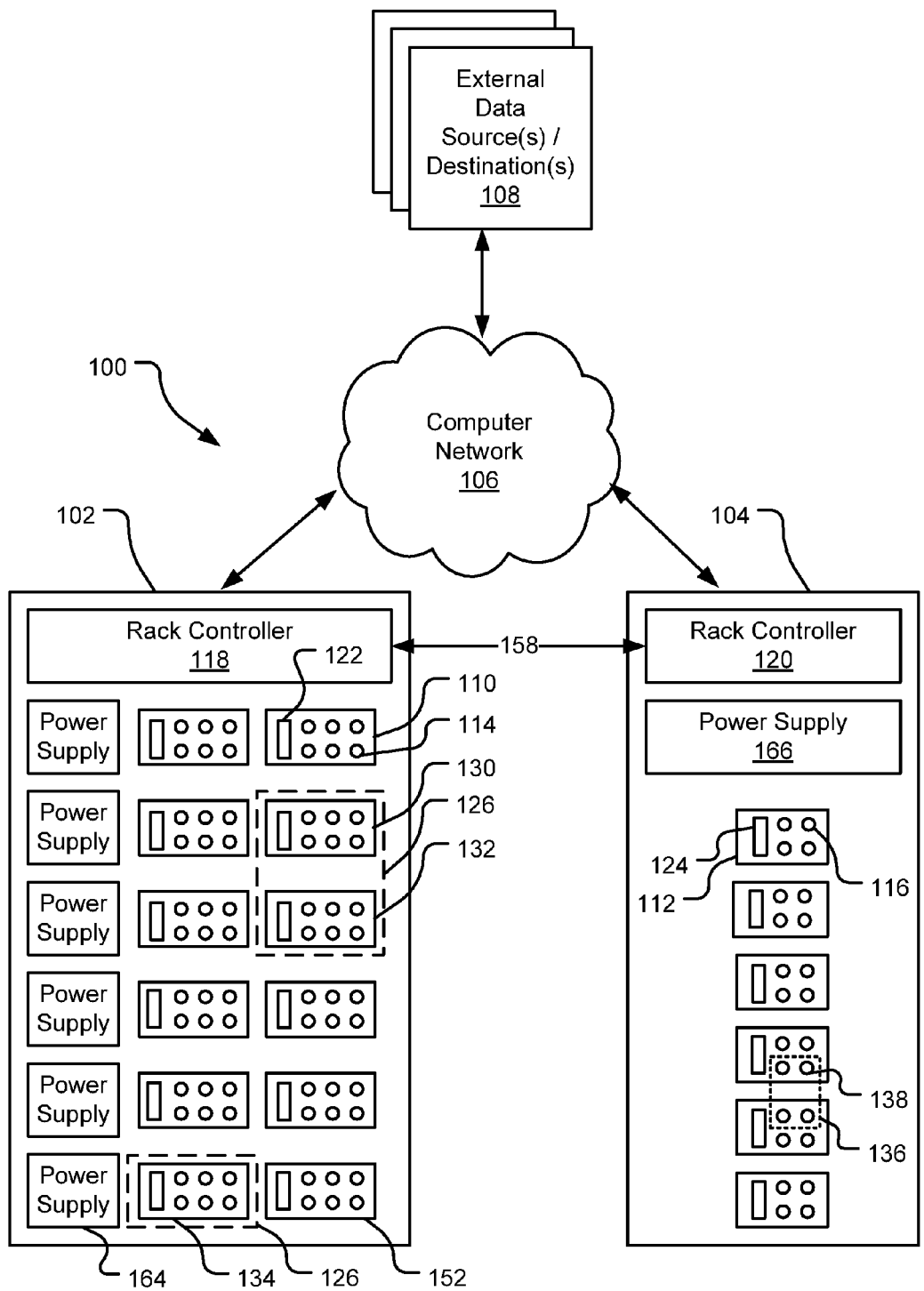
FIG. 1 illustrates an example mass data storage system with features for mapping power characteristics within the system.

Efficient use of power is an important aspect of running data storage devices, especially in some embodiments such as a data center environment designed to serve as a public or private cloud storage system. On-line mass data storage (sometimes referred to as secondary or cloud storage) refers to one or more interconnected data storage units that are actively running and available for data access operations (i.e., read and/or write operations). Example on-line mass data storage units include hard disk drives ("HDDs"), optical drives, solid state drives ("SSDs"), and flash memory. Typically, time to data ("TTD") for on-line mass data storage units is less than 2 milliseconds. On-line mass data storage benefits from very high TTD capabilities, but is expensive to build and operate. More specifically, individual on-line mass data storage units are typically of a relatively high quality, driving build costs up. The individual on-line mass data storage units also consume significant power in an on-line state, driving operating costs up.

Near-line (or near on-line) mass data storage refers to one or more interconnected data storage units that are powered on, but kept a low power consumption state when not in use and brought to an on-line state before running data access operations. Hard disk, optical, and/or flash memory drives may also be used for near-line storage, with an additional mechanism to bring a selected storage unit to an on-line state for data access operations. Such example mechanisms are robotic near-line storage (i.e., the system is aware of where a desired data chunk resides on a physical volume and utilizes a robotic mechanism to retrieve the physical volume for data access operations) and HDD near-line storage (e.g., a massive array of idle discs ("MAID")). MAID systems archive data in an array of HDDs that are operating in a standby power state, most of which are not spinning. The MAID system spins up each HDD on demand when desired to perform data access operations on a disc within that drive. Typically, TTD for MAID-type near-line mass data storage units is less than 4 milliseconds. Near-line mass data storage systems have lower operating costs than on-line mass data storage systems due to the reduced power demand, but may have similar build costs.

Off-line (or cold) mass data storage refers to one or more interconnected data storage units that are kept in a power off state and/or utilize remotely located storage media to store data. Typically, off-line mass data storage utilizes one or more interconnected tape drives, each with numerous tapes associated with the drive. As discussed above with regard to robotic near-line storage, a desired tape is retrieved from its storage location and loaded into its associated drive for data access operations. In off-line tape mass data storage units, the desired tape is often manually retrieved and loaded. As a result, TTD for off-line tape mass data storage units can be greater than 24 hours. While the build and operating costs of off-line tape mass data storage are low, some applications require a faster access time than 24 hours, but not as fast as on-line or near-line mass data storage systems.

The disclosed off-line HDD mass data storage systems can achieve TTD greater than 4 milliseconds and typically faster than that of off-line tape mass data storage while maintaining build and operating costs competitive with off-line tape mass data storage. This is accomplished, in part, by discovering power attributes within the mass data system to connect one or more limited power supply resources to one or more power consuming devices.

FIG. 1 illustrates an example mass data storage system 100 with features for mapping power characteristics within the system 100. The storage system 100 (e.g., a server cluster or farm) includes a number of storage racks (e.g., storage racks 102, 104) oriented in adjacent or separate physical locations or facilities (e.g., data rooms or centers). In some implementations, a first quantity of storage racks is located in a first server facility, a second quantity of storage racks is located in a second server facility, and so on. The server facilities may be separated by any distance (e.g., several feet or many miles). The storage system 100 may accommodate any number of storage racks and each rack is located in one of any number of server facilities. The storage system 100 may accommodate any use of mass data storage (e.g., content delivery, backup, archiving, running scientific simulations such as computational fluid dynamics, and rendering computer generated imagery, such as a render farm).

The individual storage racks are interconnected to one another via a computer network 106 (e.g., Gigabit Ethernet or a custom interconnect network). Further, the interconnected storage racks may be connected to one or more external data source(s) and/or destination(s) 108 via the same computer network 106 or an additional interconnected network (e.g., a local area network or a wide area network, not shown). Communication between the storage racks 102, 104, computer network 106, and the external data source(s) and/or destination(s) 108 may occur using a variety of communication protocols (e.g., transmission control protocol/internet protocol ("TCP/IP"), packet over synchronous optical networking/synchronous digital hierarchy ("SONET/SDH"), multiprotocol label switching ("MPLS"), asynchronous transfer mode ("ATM"), Ethernet, and frame relay). As a result, data may be accessed and moved between the individual storage racks and the external data source(s) and/or destination(s) 108 as desired.

Each individual storage rack includes an array of storage media units (also referred to as physical zones), each of which are selectively powered by one or more power supplies and are controlled by a rack controller (alternatively referred to as a "storage rack server" or a "storage system server"). For example, storage rack 102 includes 12 individual storage media units (e.g., storage media unit 110) and 6 individual power supplies (e.g., power supply 164), all of which are controlled by rack controller or expander 118. Storage rack 104 includes 6 individual storage media units (e.g., storage media unit 112) and 1 power supply 166, all of which are controlled by rack controller 120. In some implementations, individual storage racks may include greater or fewer individual storage media units than the depicted 12 and 6 storage media units per storage rack and greater or fewer individual power supplies than the depicted 6 and 1 power supplies per storage rack. In other implementations, some racks may not include a rack controller and/or an individual rack controller may control multiple racks. In still other implementations, an individual power supply may power multiple racks.

Each media unit within a storage rack includes an array of individual storage drives controlled by a media unit controller. For example, the media unit 110 includes 6 individual storage drives (e.g., storage drive 114) controlled by media unit controller (or zone board) 122. The media unit 112 includes 4 individual storage drives (e.g., storage drive 116) controlled by media unit controller 124. In other implementations, individual storage media units may include greater or fewer storage drives than the depicted 6 and 4 storage drives per media unit.

The power supplies may power multiple media units or a single media unit. For example, each power supply in storage rack 102 powers a pair of media units (e.g., power supply 164 powers media units 134, 152). Power supply 166 powers all 6 media units in storage rack 104. An upper end power capability of each individual power supply may determine how many storage drives may be operated simultaneously by that power supply, which may range from a single media unit to multiple media units.

In some implementations, the individual media units are selectively installed and uninstalled from a storage rack (e.g., configured as a blade, which corresponds to the storage rack physical configuration). In an example standard server-rack configuration, the individual storage racks are each subdivided into individual rack units (e.g., 42 rack units), where a pair of media units are physically dimensioned to fill one rack unit (i.e., 19 inches wide by 1.75 inches tall) and thus each storage rack can accommodate a total of 84 media units. In other implementations, the storage rack and rack units are physically dimensioned to accommodate any desired number of media units.

In one implementation, each storage drive is a distinct storage medium or set of storage media with some or all of the read/write control functions of the storage drive removed to the corresponding media unit controller and/or rack controller of the mass data storage system 100. As a result, one or both of the media unit controller and/or rack controller of the mass data storage system 100 can selectively power (e.g., power-on, power-off, spin-up, spin-down, etc.) an individual storage drive as desired to read data from and/or write data to the individual storage drive without having to supply power to each individual storage drive continuously. As used herein, the term "off state" refers to a state where no power is supplied to a device. One example selective powering operation powers a storage resource from an off state to an on state. In the on state, normal data transfer operations (e.g., read and write operations) of the storage device can be performed.

In another implementation, read/write control functions of one or more of the storage drives are retained within the storage drives and are thus not removed to the corresponding media unit controller and/or rack controller of the mass storage system 100. Therefore, some or all storage drives in the mass storage system 100 may retain self-powering resources and have the ability to effectuate a "power on" or "power off" mode change in response to communication from a rack controller or media unit.

In various implementations, some or all of the control hardware and software for each individual storage drive is removed to a corresponding media unit controller and/or rack controller, thereby centralizing control functions of the individual storage drives to a media unit level and/or a rack level. Further, the individual storage drives may utilize any available storage technology (e.g., magnetic storage, optical storage, semiconducting storage (e.g., flash-based solid state)).

By moving some or all of the control hardware/software of the individual storage drives into the corresponding media unit controller and/or rack controller, the individual storage drives may have disparate characteristics (e.g., storage technology (e.g., magnetic, optical, semiconducting), performance characteristics and power characteristics). Operation of the mass data storage system 100 may be optimized based on the characteristics of the storage drives available within the system 100. In some implementations, each of the individual storage drives within a media unit has disparate characteristics, but each media unit has the same characteristics (i.e., similar within industry acceptable tolerances). In other implementations, the media units have disparate characteristics as well.

Drives that do not exceed a maximum power threshold may be characterized as having the same (or similar) power characteristics. For example, drives that draw no more than 10 Watts of power may be referred to herein as 10 Watt drives. Similar drives that draw no more than 10 Watts of power are referred to herein as having the same or similar power characteristics. Wattage is one example storage drive power characteristic. Other power characteristics are contemplated herein (e.g., current, voltage, peak RMS power, power factor, etc.).

Drives with performance characteristics that meet an operational threshold may be characterized as having the same (or similar) performance characteristics. For example, a 4 terabyte drive has the capability of storing at least 4 terabytes of data and is formatted to store exactly 4 terabytes of data. Drives that meet this threshold are referred to herein as having the same or similar storage capacity. Drives that do not have the capability of storing 4 terabytes of data and/or drives that are formatted to store a different quantity of data are referred to herein as having disparate storage capacity.

Drives with performance characteristics that maintain an operational target may also be characterized as having the same (or similar) performance characteristics. For example, a 7200 RPM storage drive may vary rotational speed from 7200 RPM by no more than 1% during data access operations. Drives that meet this operating limitation are referred to herein as having the same or similar rotational speeds. Drives that fail to meet this operating limitation are referred to herein as having disparate rotational speeds. Storage capacity and rotational speed are two example storage drive performance characteristics. Other performance characteristics are contemplated herein (e.g., read speed, write speed, security level (e.g., encoded or not encoded), etc.).

In some implementations, groupings of individual storage drives and/or media units with the same power characteristics are defined by the corresponding media unit controller and/or rack controller as belonging to a common logical zone. For example, a logical zone may include a selection of individual media units within a storage rack that may or may not be physically adjacent within the storage rack. For example, logical zone 126 includes physically adjacent media units 130, 132 and non-adjacent media unit 134 within storage rack 102.

In other implementations, a logical zone includes a selection of individual storage drives within a storage rack that also may or may not be physically adjacent within the storage rack. For example, logical zone 136 includes a selection of 4 individual storage drives (e.g., storage drive 138) spanning two different media units and sharing power supply 166 within the storage rack 104. Groupings of individual storage drives or media units into logical zones may be made based on any criteria, and may even be arbitrary.

Each of the rack controllers 118, 120 are communicatively coupled to the media unit controllers within corresponding racks 102, 104, respectively, and media unit controllers (e.g., media unit controller 122) are communicatively coupled to an associated nest of storage drives (e.g., storage drive 114) via compute nodes, serial attached small computer system interface ("SAS") connections, etc.

In a power attribute discovery operation, a zone manager (see e.g., zone manager 242 of FIG. 2) running on each of the rack controllers 118, 120 requests power information from all power nodes within the corresponding racks 102, 104 to generate or update a power map for each rack or an overall power map for the entire storage system 100. The power map includes information relating to each of the system resources (e.g., rack controllers, power supplies, media units, media unit controllers, storage drives, interfaces, and associated inter-integrated circuits ("I2C")), for example, power needs and capabilities of the system resources, physical locations of the system resources, and power source connectivity between the system resources, etc. Each of the power consuming system resources is referred to herein as a power node.

In one implementation, the rack controllers 118, 120 uses one or more available communication channels (e.g., I2C, SAS, serial advanced technology attachment ("SATA"), universal serial bus ("USB"), peripheral component interconnect express ("PCIe"), Ethernet, wireless channels, etc.) to initiate a discovery request for power information from each of the power nodes within their corresponding racks 102, 104, respectively. In another implementation, an external zone manager requests the power information from the racks 102, 104 via a TCP/IP request through the computer network 106.

Some power nodes (e.g., rack controllers, media units, media unit controllers, storage drives) may have predefined power characteristics that are stored in memory of the power nodes. Upon receipt of a discovery request, these power nodes can transmit the request to other communicatively coupled power nodes and/or respond directly to the request with the requested information. Other power nodes (e.g., the interfaces and I2Cs) may not store predefined power characteristics. The rack controllers 118, 120 may discover the power characteristics of these power nodes by measuring power load consumed by these power nodes during operation.

In one implementation, the rack controllers 118, 120 initiate a discovery request that is transmitted to all of the media unit controllers within their corresponding racks 102, 104. Each of the media unit controllers gathers the requested information from their respective storage drives via SAS connections and/or expanders or other suitable communication protocols. For example, the media unit controller 122 may gather power information relating to each of the six storage drives within the media unit 110. The gathered power information is transmitted back through the appropriate communication channels to the requesting rack controller 118.

The rack controllers 118, 120 can also transmit the discovery request to power nodes outside of their corresponding racks 102, 104. For example, the rack controller 118 can transmit the discovery request to the rack controller 120. In this manner, a single power discovery request may propagate between racks (e.g., via communication channel 158) and to each power node within the entire storage system 100. The rack controllers 118, 120 use the discovered power information and resulting power map to selectively power one or more available storage resources to enable data access operations of the mass data storage system 100.

For example, in response to a read or write command, the mass data storage system 100 uses the detailed mapping of the power network and storage resources within the system 100 to identify available storage locations to receive data (if the command is a write command) or act as a data source (if the command is a read command). Using a number of power constraints and data requirements, the mass storage system 100 selectively powers on one or more storage resources including the identified available storage locations. After execution of the read or write command, the selectively powered storage resources are returned to an off-line (powered off) state. Storage resources selectively powered for each data transfer operation (e.g., read operation or write operation) may be on the same or different media units and/or storage racks.

Figure 2:
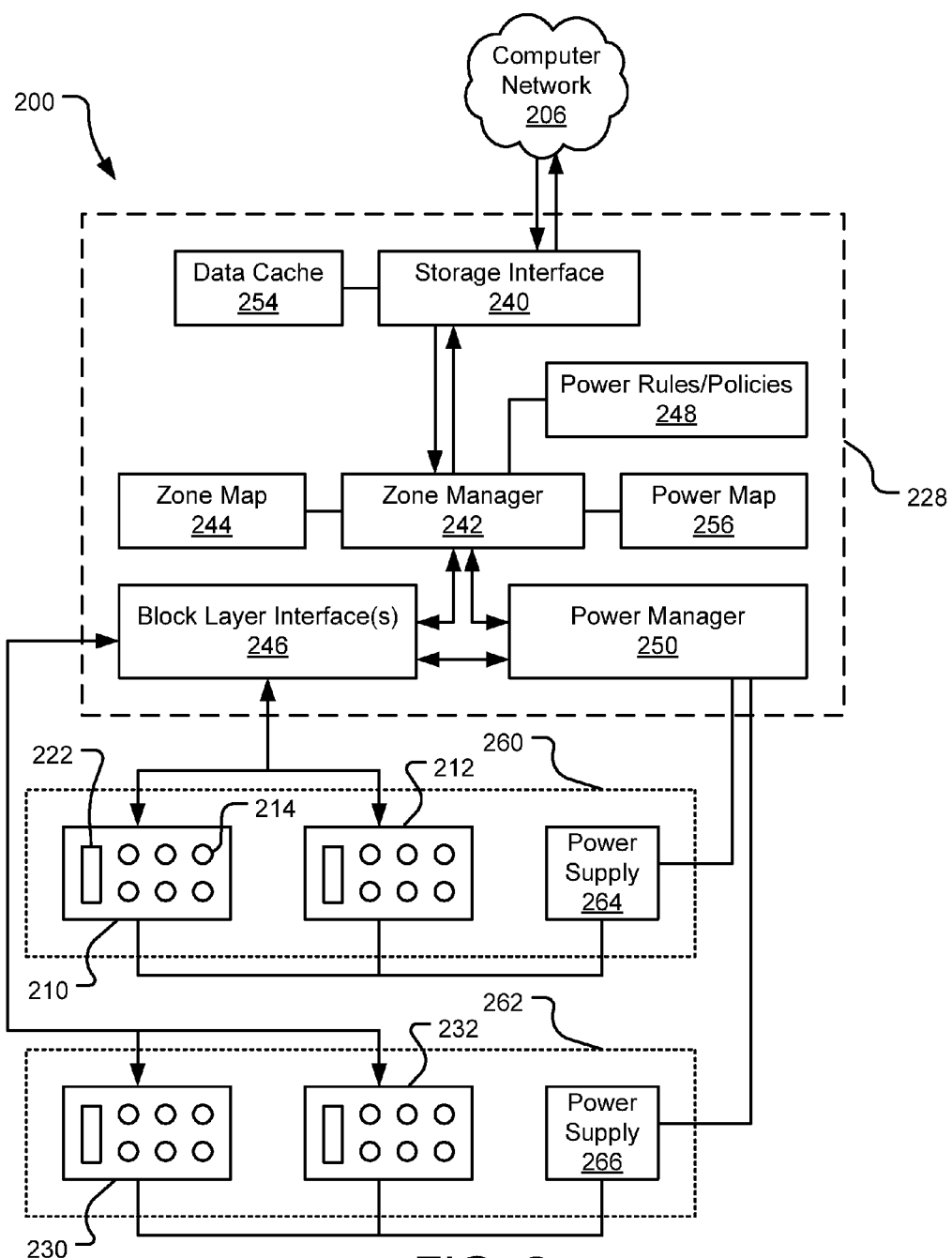
FIG. 2 illustrates an example control system for mapping power characteristics within a mass data storage system.

FIG. 2 illustrates an example control system 228 for mapping power characteristics within a mass data storage system 200. Aspects of the mass data storage system 200 may be contained within a rack controller (e.g., rack controller 118 of FIG. 1) and/or a media unit controller (e.g., media unit controller 122 of FIG. 1 or media unit controller 222 of FIG. 2) associated with each individual storage drive (e.g., a storage drive 214) of the mass data storage system 200. In some implementations, aspects of the storage system 200 may span multiple racks and/or geographic locations.

The control system 228 includes a storage interface 240 that allows the mass data storage system 200 to conduct data access operations (e.g., receive incoming data from external data source(s) in a computer network 206 and send outgoing data to external data destination(s) in the computer network 206. See e.g., external data source(s) and destination(s) 108 of FIG. 1, each of which that may have disparate operating systems operating over one or more computer networks.

A zone manager 242 works in conjunction with a zone map 244 and an incoming data/outgoing data cache 254, which allows the mass data storage system 200 to use and leverage media units (and storage drives) with disparate characteristics. For example, non-compliant or obsolete storage drives that do not meet or maintain a particular performance threshold for stand-alone use may be used in the mass data storage system 200 rather than being discarded. In addition, storage drives that consume more power than a desired power threshold may be used in the mass data storage system 200.

Many different types of drives may be used simultaneously in conjunction with one another. The zone manager 242 works in conjunction with the zone map 244 to maximize performance of the mass data storage system 200 overall based at least in part on the individual performance characteristics of the individual storage drives within the mass data storage system 200. In various implementations, the zone manager 242 includes an object manager, a file system manager, or a proprietary interface. Further, the zone manager 242 may be incorporated into block layer interface(s) 246. In another implementations, the zone manager 242 may utilize a tape interface (e.g., a tape controller or tape library) to maximize performance of the mass data storage system 200.

The zone manager 242 is communicatively coupled, through the block layer interface(s) 246, to a plurality of power nodes (e.g., racks, rack controllers, media units, media unit controllers, power supplies, interfaces, individual storage drives, etc.) within the mass storage system 200. The power nodes communicatively coupled to the zone manager 242 belong to the same or a different logical and/or physical zone. Communication channels allow for bidirectional data flow between the power nodes in the mass data storage system 200. For example, the zone manager 242 may be communicatively coupled to a plurality of different rack controllers; each rack controller may be communicatively coupled to media unit controllers within the corresponding rack; and each of the media unit controllers may be communicatively coupled to an associated nest of internal storage drives, all of which are power nodes.

The zone manager 242 may be implemented in a computer-readable storage media readable by a computing node within or communicatively coupled to the mass data storage system. The term "computer-readable storage media" includes, but is not limited to, random access memory ("RAM"), read-only memory ("ROM"), electrically erasable programmable read-only memory ("EEPROM"), flash memory, compact disc read-only memory ("CDROM"), digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to computer-readable storage media, computer-readable communication signals may embody computer readable instructions, data structures, program modules, or other data resident in a modulated data signal, such as a carrier wave or other signal transport mechanism.

In implementations where individual storage drives and/or entire media units are kept in a low power (e.g., spun down) or completely unpowered state during periods of inactivity, the zone manager 242 initially and/or periodically performs power mapping operations to identify the needs of each power node (e.g., racks, rack controllers, media units, media unit controllers, interfaces, individual storage drives, etc.) and the power supply resources (e.g., power supplies) available to operate the power nodes. The power needs of each power node within the mass data storage system 200 are stored in a power map 256.

The zone manager 242 has access to a number of power rules and policies 248, also referred to herein as power constraints. The power rules and policies 248 govern power consumption, distribution, and usage within the mass data storage system 200. In one implementation, each storage rack is physically equipped with a power supply capable of powering a maximum number of storage drives and/or media units within the storage rack. The zone manager 242 stores this power constraint as one of the power rules and policies 248. The zone manager 242 applies this power constraint before powering a quantity of drives and/or media units within the storage rack to ensure that the mass storage system 200 does not exceed a power supply capability within the storage rack.

In another implementation, each storage rack is physically equipped with several power supplies; each power supply connected to one or more media units within the storage rack. Each power supply is capable of powering a maximum number of storage drives simultaneously within the media units that it services. The zone manager 242 stores this power consumption constraint as one of the power rules and policies 248. The zone manager 242 applies this power constraint before simultaneously powering a quantity of drives within the storage rack to ensure that the mass storage system 200 does not exceed power supply capabilities of any of its power supplies.

Responsive to a data access request, the zone manager 242 identifies available storage resources (e.g., storage drives and/or media units) for receiving data or for acting as a data source. "Available" resources are storage resources that can be utilized for data access operations without violating one or more of the power constraints of the mass storage system 200. In one implementation, the zone manager 242 identifies available storage resources by querying system compute nodes through the block layer interface(s) 246. In another implementation, the zone manager 242 identifies available storage resources by accessing the power map 256, which is periodically updated to include such information. In yet another implementation, the zone manager 242 queries available storage resources through corresponding I2C interfaces to populate the power map 256.

The zone manager 242 also communicates with a number of different additional managers or modules (not shown) to identify applicable read or write parameters for execution of the data access operation. For example, the zone manager 242 may consult with a data durability manager and/or a data efficiency manager to ensure that the read or write operation is performed in compliance with various data durability and data efficiency requirements.

For example, the control system 228 controls rack units 260, 262. Rack unit 260 includes power supply 264 selectively powering each storage drive within media units 210, 212. The media units 210, 212 are connected back to the control system 228 for data access operations over the block layer interface(s) 246 via one or more suitable communication channels. Rack unit 262 includes power supply 266 selectively powering each storage drive within media units 230, 232. The media units 230, 232 are also connected back to the control system 228 for data access operations over the block layer interface(s) 246 via one or more suitable communication channels.

The zone manager 242 communicates with a power manager 250 to power up selected storage drives and/or media units for the data access operation using the power supplies 264, 266 without exceeding the power supply capabilities of either power supply. In one implementation, the zone manager 242 communicates with the block layer interface(s) 246 and one or more storage devices of the system 200 through the power manager 250. For example, the power manager 250 may communicate with the block layer interface(s) 246 through an I2C or SCSI enclosure services ("SES") interface.

The power supplies 264, 266 have the capability to simultaneously power one or more associated storage drives and media units. In various implementations, powering up and powering down a storage drive or a media unit refers to effecting a change in the power state within the device ranging from a completely unpowered state (no power is supplied to stored within the unit) or a fully powered state (the device is fully powered up, spinning if applicable, and ready for read/write operations) and various partial power states there between.

Figure 3:
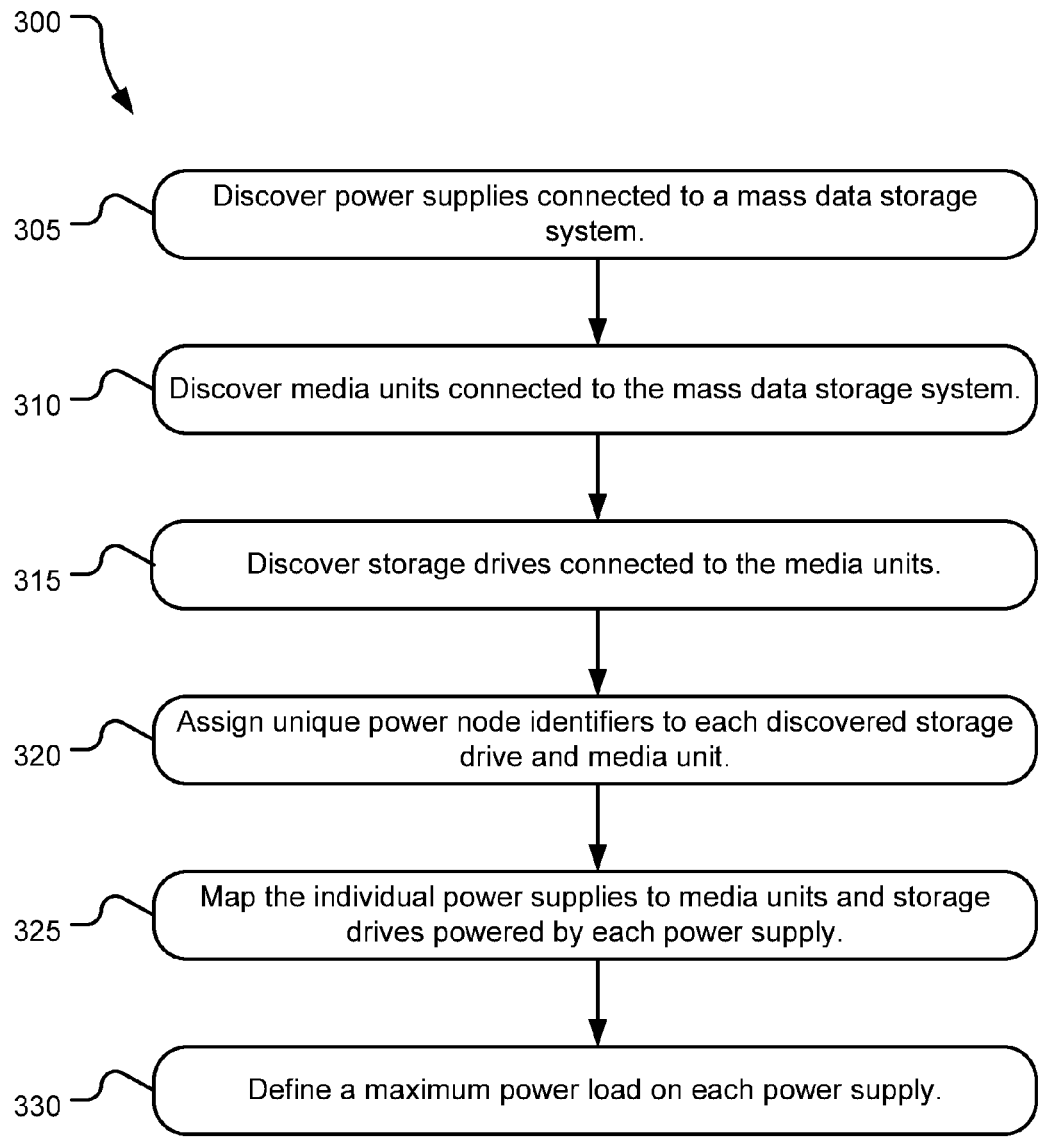
FIG. 3 illustrates example operations for mapping power attributes within a mass data storage system.

FIG. 3 illustrates example operations 300 for mapping power attributes within a mass data storage system. According to one implementation, the mass storage system includes multiple racks, each including a rack controller and an array of media units. Each of the media units includes an array of individual storage drives controlled by a media unit controller. The operations 300 may be performed by one or more media unit controllers and/or rack controllers.

A first discovering operation 305 discovers power supplies connected to a mass data storage system. In some implementations, the first discovering operation 305 discovers power supplies within an individual rack in the mass data storage system. In other implementations, the first discovering operation 305 discovers power supplies across multiple racks in the mass data storage system. The first discovering operation 305 discovers the presence and location of each power supply within the mass data storage system, each power supply's availability to provide power to the mass data storage system, and each power supply's total power supply capacity.

A second discovering operation 310 discovers media units connected to the storage system. Each media unit is a collection of two or more storage drives with common control circuitry. The second discovering operation 310 discovers the presence and location of each media unit within the mass data storage system, each media unit's availability for data access operations, and each media unit's power load when in operation.

A third discovering operation 315 discovers storage drives connected to the media units. Each storage drive is selectively powered during operation of the mass data storage system for data access operations when needed. The third discovering operation 315 discovers the presence and location of each storage drive within the mass data storage system, each storage drive's availability for data access operations, and each storage drive's power load when in operation. In various implementations, the storage drives within the mass data storage system are of different types and/or capacities. As a result, each storage drive may have a different power load when in operation.

In some implementations, the third discovering operation 315 is accomplished by powering up each individual storage drive and reading drive configuration data within the powered storage drive. In other implementations, the third discovering operation 315 is accomplished by powering up each individual storage drive and measuring power load data from the storage drive during a test data access operation.

In some implementations, a zone manager requests a "power discovery package" from each of a plurality of media unit controllers and/or rack controllers to conduct the discovery operations 305, 310, 315. Information included in the discovery package may include, for example, how many media units are connected to each power supply, which storage drives and/or media units are currently in use, available storage space on various storage drives, and/or power requirements for powering on each power node. In various implementations, other power nodes (e.g., interfaces and inter-integrated circuits) are discovered within the storage system as well.

In some implementations, the zone manager initiates a query that descends intra-rack through a series of power nodes (e.g., from a rack controller to media unit controllers) and/or travels between different racks, such as from one rack controller to another, descending through power nodes of each respective rack. The rack controllers and/or media unit controllers retrieve the requested information and relay such information back through appropriate communication channels to the source of the request (e.g., a zone manager). For example, a media unit controller may be coupled to a number of internal storage drives via an SAS expander and can retrieve information from the coupled storage drives regarding power states and requirements.

An assigning operation 320 assigns unique power node identifiers to each discovered storage drive and media unit. The power node identifiers are used to generate a power map (see mapping operation 325 below) and allow the storage drives and media units to be re-discovered (see FIG. 4) if physically moved within the storage system. In various implementations, the power node identifiers may also be used to logically group the storage drives and media units to represent positional data in a data protection scheme. Further, the power node identifiers may also be grouped by tape, disk, file system, or object front-end. The power node identifiers may further be grouped within an individual rack or across multiple racks.

A mapping operation 325 maps the individual power supplies to media units and storage drives powered by each power supply. The result is a power map that defines all power relationships between each power supply and each power node (or power consumer) within the storage system.

A defining operation 330 defines a maximum power load on each power supply. More specifically, the defining operation compares the power supply capability of each power supply with the power load of each power node connected to the power supply. The net result is a maximum number of power nodes or combinations of power nodes that each power supply can support simultaneously. In various implementations, this information is stored within the power map. In other implementations, this information forms separate power rules and policies (or "power constraints").

The power constraints include, for example, localized or system-wide caps set to constrain, distribute, and regulate power consumption for different components of the mass storage system, such as a media unit, rack, logical zone, physical zone, etc. In one implementation, a power constraint specifies a maximum number of storage drives that can be powered on per media unit at any given time. For example, a media unit may be permitted to power no more than 2 of 6 drives at any given time. In another implementation, a power constraint specifies a maximum rate of power consumption for powering various homogeneous and/or disparate storage resources within an individual media unit. In still another implementation, a power constraint limits the maximum number of storage resources that can be on-line and powered by an individual power source. Different media units, racks, logical zones, physical zones, etc. may have different power constraints.

Figure 4:
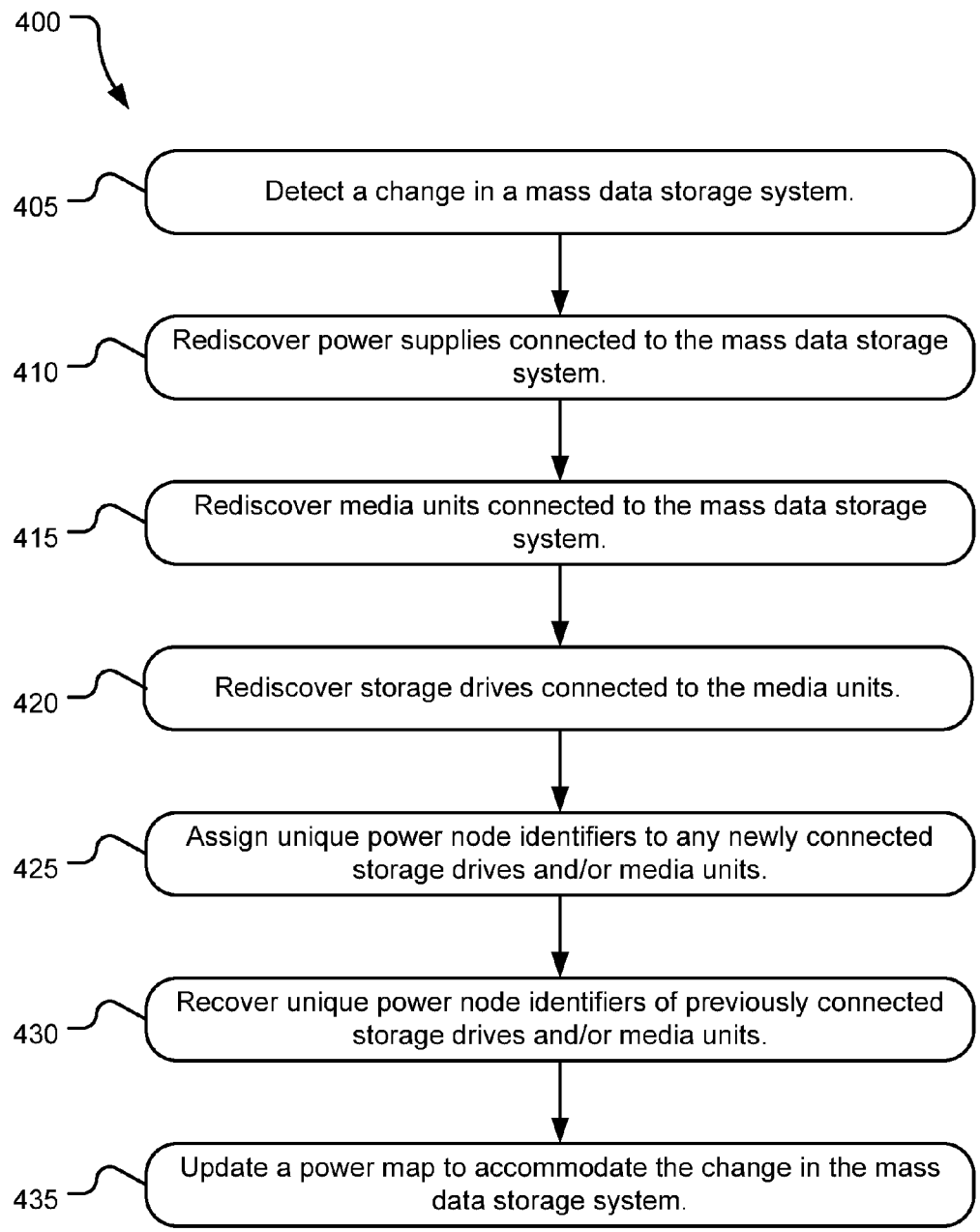
FIG. 4 illustrates example operations for updating power attributes within a mass data storage system.

FIG. 4 illustrates example operations 400 for updating power attributes within a mass data storage system. According to one implementation, the mass data storage system includes multiple racks, each including a rack controller and an array of media units. Each of the media units comprises an array of individual storage drives controlled by a media unit controller. The operations 400 may be performed by one or more media unit controllers and/or rack controllers.

A detection operation 405 detects a change in the mass data storage system. The change can be one or more of a failure, movement, removal, and addition of a power node to the storage system, for example. The change may be detected when the system automatically detects the missing/moved/failed/added power node, detects when a power node is physically plugged or unplugged from the storage system, or a technician signals to the to the system that a power node is missing, moved, failed, removed, and/or added, for example. The change may also be detected when a new data access request is received into the storage system prompting re-discovery operations and/or when periodic re-discovery operations are performed, for example.

A first re-discovery operation 410 re-discovers power supplies connected to the mass data storage system. In some implementations, the first re-discovery operation 410 re-discovers the presence and location of each power supply, each power supply's availability to provide power, and each power supply's total power supply capacity within the mass data storage system. In other implementations, the first re-discovery operation 410 re-discovers the presence and location of any changed power supply, any changed power supply's availability to provide power, and any changed power supply's total power supply capacity within the mass data storage system.

A second re-discovery operation 415 re-discovers media units connected to the mass storage system. Each media unit is a collection of two or more storage drives with common control circuitry. In some implementations, the second re-discovery operation 415 discovers the presence and location of each media unit within the storage system, each media unit's availability for data access operations, and each media unit's power load when in operation. In other implementations, the second re-discovery operation 415 discovers the presence and location of any changed media unit, any changed media unit's availability for data access operations, and any changed media unit's power load when in operation within the mass data storage system.

A third re-discovery operation 420 re-discovers storage drives connected to the media units. In some implementations, the third re-discovery operation 420 discovers the presence and location of each storage drive, each storage drive's availability for data access operations, and each storage drive's power load when in operation within the data storage system. In other implementations, the third re-discovery operation 420 discovers the presence and location of any changed storage drive, any changed storage drive's availability for data access operations, and any changed storage drive's power load when in operation within the mass data storage system.

An assigning operation 425 assigns unique power node identifiers to any newly connected storage drives and/or media units. The power node identifiers are used to update a power map (see updating operation 435 below) and allow the newly connected storage drives and media units to be re-discovered if physically moved within the mass data storage system.

A recovering operation 430 recovers unique power node identifiers of previously connected storage drives and/or media units. If a storage drive and/or media unit is re-connected to the mass data storage system, the mass data storage system may recognize the previously connected storage drive and/or media unit and reconnect the storage drive and/or media unit with it's previous identifier. In other implementations, re-connected storage drives and/or media units are assigned new unique power node identifiers.

An updating operation 435 updates a power map to accommodate the change in the mass data storage system. The result is a power map that defines all power relationships between each power supply and each power node (or power consumer) within the storage system, including the changed power node(s). The updating operation 435 also updates the maximum power load on each power supply, if needed, in response to the change in the mass data storage system.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method of operating a mass data storage system comprising:
   mapping multiple storage drives to one or more power supplies within the storage system;
   defining a power constraint on each of the one or more mapped power supplies during operation of the storage system; and
   discovering a power requirement of each of the mapped storage drives connected to the storage system;
   responsive to receipt of a data transfer command, identifying a plurality of the multiple storage drives that can be simultaneously powered without exceeding the power constraint on any one of the one or more power supplies, the power constraint depending on a maximum number of the mapped storage drives connected to one or more of the mapped power supplies that may be simultaneously powered; and supplying power to the identified plurality of the multiple storage drives prior to execution of the data transfer command.

2. The method of claim 1, wherein the discovering operation further includes:
selectively powering each mapped storage drive; and
reading data from each mapped storage drive defining its power requirement.

3. The method of claim 1, wherein the discovering operation further includes:
selectively powering each mapped storage drive; and
measuring power consumption from each mapped storage drive.

4. The method of claim 1, wherein the power requirement of the multiple storage drives varies.

5. The method of claim 1, further comprising:
mapping the multiple storage drives to one or more media units within the storage system.

6. The method of claim 1, further comprising:
mapping one or more of rack controllers, media unit controllers, interfaces, and inter-integrated circuits to the one or more power supplies within the storage system.

7. The method of claim 1, wherein the power constraint is characterized by a maximum number of media units connected to a mapped power supply that may be simultaneously powered.

8. The method of claim 1, wherein each mapped storage drive is assigned a unique identifier.

9. A mass data storage system comprising:
a plurality of storage drives;
one or more power supplies, each of which connected to at least two of the plurality of storage drives;
a control system including:
a power map defining the connections between the storage drives and the power supplies; and
a power rules module defining a power constraint on each mapped power supply during operation of the storage system, the power constraint depending on a maximum number of the storage drives connected to each of the one or more power supplies that may be simultaneously powered; and
a zone manager stored in memory and configured to access the power map responsive to receipt of a data transfer command and utilize the power map to identify a subset of the plurality of storage drives that can be simultaneously powered without exceeding the power constraint on any of the power supplies, the zone manager further configured to selectively power the identified subset of the plurality of storage drives prior to execution of the data transfer command.

10. The mass data storage system of claim 9, wherein the power map further defines a power requirement of each of the storage drives.

11. The mass data storage system of claim 10, wherein the power requirement of the two or more storage drives varies.

12. The mass data storage system of claim 9, further comprising:
one or more media units, wherein the power map further defines connections between the two or more storage drives and the one or more media units.

13. The mass data storage system of claim 9, further comprising:
one or more of rack controllers, media unit controllers, interfaces, and inter-integrated circuits, wherein the power map further defines connections between the rack controllers, media unit controllers, interfaces, and inter-integrated circuits and the power supplies and the storage drives.

14. The mass data storage system of claim 9, wherein the power constraint is characterized by a maximum number of media units connected to a power supply that may be simultaneously powered.

15. The mass data storage system of claim 9, wherein each of the two or more storage drives is assigned a unique identifier within the power map.

16. A non-transitory computer-readable storage media of a tangible article of manufacture encoding processor-executable instructions that, when executed by a processor, cause the processor to:
map multiple storage drives to one or more power supplies within a mass data storage system;
define a power constraint on each mapped power supply during operation of the storage system, the power constraint depending on a maximum number of the mapped storage drives connected to each of the one or more of the power supplies that may be simultaneously powered; and
discover a power requirement of each of the mapped storage drives within the storage system;
responsive to receipt of a data transfer command, identify a plurality of the multiple storage drives that can be simultaneously powered without exceeding the power constraint on any one of the one or more power supplies; and
supply power to the identified plurality of the multiple storage drives prior to execution of the data transfer command.

17. The non-transitory computer-readable medium of claim 16, wherein the processor-executable instructions further cause the processor to:
selectively power each mapped storage drive; and
read data from each mapped storage drive defining its power requirement.

18. The non-transitory computer-readable medium of claim 16, wherein the processor-executable instructions further cause the processor to:
selectively power each mapped storage drive; and
measure power consumption from each mapped storage drive.

* * * * *